US008152188B2

(12) United States Patent
Kylstra

(10) Patent No.: US 8,152,188 B2

(45) Date of Patent: Apr. 10, 2012

(54) HAND GRIP MOTION CONTROL CAPABILITIES FOR A LEVER PROPULSION WHEELCHAIR

(75) Inventor: Bart Kylstra, San Francisco, CA (US)

(73) Assignee: Daedalus Wings, Inc., San Francisco, CA (US)

( * ) Notice: Subject to any disclaimer, the term of this patent is extended or adjusted under 35 U.S.C. 154(b) by 0 days.

(21) Appl. No.: 12/229,146

(22) Filed: Aug. 20, 2008

(65) Prior Publication Data

US 2009/0051138 A1 Feb. 26, 2009

Related U.S. Application Data

(60) Provisional application No. 60/965,257, filed on Aug. 20, 2007.

(51) Int. Cl.
*B62M 1/14* (2006.01)

(52) U.S. Cl. ...... 280/250.1; 188/2 F; 280/246; 280/255; 280/304.1

(58) Field of Classification Search ............... 280/250.1, 280/304.1, 244, 246, 247, 255, 258; 188/2 F, 188/2 D, 265, 31, 29; 74/502.2, 526
See application file for complete search history.

(56) References Cited

U.S. PATENT DOCUMENTS

| | | | | |
|---|---|---|---|---|
| 4,358,126 | A | 11/1982 | Mitchell et al. | |
| 4,560,181 | A | 12/1985 | Herron | |
| 4,735,431 | A | 4/1988 | Tait | |
| 4,811,964 | A * | 3/1989 | Horn | 280/250.1 |
| 4,993,732 | A * | 2/1991 | Wedemeyer | 280/250.1 |
| 5,263,729 | A | 11/1993 | Watwood et al. | |
| 5,499,833 | A * | 3/1996 | Her et al. | 280/247 |
| 5,632,499 | A | 5/1997 | Hutcherson et al. | |
| 5,887,486 | A * | 3/1999 | Lin et al. | 74/489 |
| 6,007,082 | A | 12/1999 | Watwood et al. | |
| 6,158,757 | A * | 12/2000 | Tidcomb | 280/250.1 |
| 6,893,035 | B2 * | 5/2005 | Watwood et al. | 280/242.1 |
| 2006/0208452 | A1 | 9/2006 | Mittelstaedt | |
| 2007/0024021 | A1 | 2/2007 | Rand et al. | |
| 2007/0251770 | A1 | 11/2007 | Hargroder | |
| 2008/0073869 | A1 | 3/2008 | Patterson | |
| 2008/0238023 | A1 * | 10/2008 | Bloom | 280/250.1 |
| 2009/0295119 | A1 * | 12/2009 | Bloswich et al. | 280/250.1 |

* cited by examiner

*Primary Examiner* — Anne Marie M. Boehler
(74) *Attorney, Agent, or Firm* — Schneck & Schneck

(57) ABSTRACT

A motion control system for lever propulsion of a wheelchair enables a number of different manipulations at the hand grip of the lever. In some embodiments, as many as five user-controlled operations may be performed without need to remove a hand from the hand grip. A user applies force to the hand grip to initiate the motion lever in its forward and rearward strokes. In addition, the hand grip may be pivoted relative to the lever in order to control a brake. A parking brake mechanism may be provided at the hand grip to apply constant brake force. The direction shifter at the top of the hand grip may be used to shift between forward, neutral and rearward modes of operation. In some embodiments, steering of a front caster wheel is possible by rotating the hand grip. Further along the lever, the power applied per lever stroke is adjustable.

9 Claims, 8 Drawing Sheets

HAND GRIP MOTION CONTROL CAPABILITIES FOR A LEVER PROPULSION WHEELCHAIR

CROSS REFERENCE TO RELATED APPLICATION

This application claims priority from provisional application No. 60/965,257, filed Aug. 20, 2007.

TECHNICAL FIELD

The invention relates generally to a motion control system for a wheelchair and more particularly to a wheelchair which may be used by a wide range of persons, including individuals with impaired upper body dexterity skills.

BACKGROUND ART

The number of people who depend upon a wheelchair for mobility increases as medical science continues to progress in the treatment of the elderly and disabled. Advances in the areas of wheelchair design and light-weight materials allow users to remain more active and to participate in more activities than in the past.

In addition to the dimensions and the weight of a wheelchair, there are a wide range of factors that are considered in designing wheelchairs and in the selection of a particular wheelchair by a disabled person. Perhaps the most obvious factor is the means for allowing a user to propel the wheelchair. The most common design is pushrim propulsion in which the user applies force to pushrims that are attached adjacent to the two main wheels. A concern with the use of pushrim propulsion is that the human body is not biomechanically suited for pushrim propulsion, so that inefficiencies, pain and sometimes injury result. Users of pushrim manual wheelchairs may suffer from Repetitive Strain Injuries (RSI) of the wrists and shoulders. The shortcomings of pushrim wheelchairs cause many users to turn to electrically powered wheelchairs. However, such wheelchairs are expensive and more difficult to transport. An alternative which addresses the concerns of pushrim and motor propulsion is the use of levers which allow the user to apply force by a "rowing" action.

Regardless of the selection of the means of propulsion, there are a number of design factors which may be considered to be "user interface" considerations. U.S. Pat. No. 4,560,181 to Herron describes a lever propulsion wheelchair that includes finger-controlled hand brakes similar to those common to bicycles. A hand brake is sufficiently close to a hand grip that a user is able to apply pressure to the hand brake while remaining in contact with the hand grip. A less complex braking arrangement is described in U.S. Patent Publication No. 2007/0024021 to Rand et al. Rather than a number of interacting components, Rand et al. connects a friction element directly on the lever and in alignment with the pushrim, such that an applied force which causes the lever to bend will cause contact between the friction element and pushrim, thereby slowing the wheelchair.

U.S. Pat. Nos. 5,263,729, 6,007,082 and 6,893,035 to Watwood et al. also describe lever propulsion wheelchairs having user-interface features on the levers. Shifting from a forward direction to a rearward direction may be accomplished by manipulating a shift paddle that projects radially from the hand grip end of a lever. A cable couples the paddle to a transmission that permits the lever drive to provide either forward or rearward propulsion. For the convenience and comfort of the user, the handle can be rotated from a position aligned with the lever to a position perpendicular to the lever. As a separate consideration, brake pads may be formed on the levers adjacent to the rims of the wheels, so that outward pressure on the levers causes the brake pads to contact the wheel rims.

Another patent of interest is U.S. Pat. No. 5,020,815 to Harris et al. The wheelchair described in Harris et al. includes a forward/reverse control lever projecting outwardly from the handle of a drive lever. Additionally, rotation of the levers causes steering of the wheelchair by linking the levers to caster wheels that are common to wheelchairs.

While prior art approaches for providing wheelchair propulsion and other motion control features operate well for their intended purposes, further advancements are sought. Of particular concern is the design of a wheelchair motion control system that is well suited for persons who are able to utilize lever propulsion, but who have dexterity difficulties. Ergonomic and easily accessible and manipulable controls increase the range of available activities and facilities for wheelchair-confined persons.

SUMMARY OF THE INVENTION

A motion control system in accordance with the invention utilizes lever propulsion and hand grip manipulations designed for persons with upper body dexterity limitations. On at least one side of a wheelchair, a lever is connected at a lever pivot to enable forward and rearward lever strokes for driving a wheel that includes a brake. Force is applied to a hand grip to initiate the forward and rearward strokes. The hand grip projects from the end of the lever, but is connected the lever along a pivot axis. Pivoting of the hand grip relative to the lever controls the application of braking force by the brake. The hand grip is biased into a brake release position in which the wheel is free to rotate. However, the hand grip and brake are linked such that pressure applied in a direction to pivot the hand grip from this brake release position induces the application of brake force.

Since force is applied to the hand grip to "row" the lever, the pivot axis must be aligned such that the force does not unintentionally pivot the hand grip to apply brake force. This is most reliably achieved if the pivot axis is aligned with the plane in which the forward and rearward lever strokes occur. In one embodiment, the brake includes a brake band that is coaxial with the wheel. The hand grip may be linked to the brake band by a cable which is connected to increase the tightening of the brake band with increasing distance of the hand grip from its brake release position.

Further benefits of the motion control system are available if a parking brake mechanism is included. The parking brake mechanism may be used to lock the hand grip from returning to its brake release condition. One use of the parking brake is to prevent the wheelchair from rolling while it is being transported in another vehicle. In one embodiment, the parking brake mechanism includes a pin that is connected to slide between first and second conditions. In the first condition, the hand grip is free to pivot to and from its brake release position. However, when the pin is in its second condition, the pin prevents return of the hand grip to the brake release position. Ease of operation is enhanced if the pin is biased into its first condition, so that the pin remains in its second condition only when the biasing on the hand grip causes the hand grip to abut the pin. Then, by rotating the hand grip further from its brake release position, the two elements are no longer in abutment and the biasing on the pin causes the pin to travel to its first condition, thereby freeing the hand grip to return to the brake release position.

The preferred embodiment also includes a direction shifter projecting from an end of the hand grip opposite to the lever. The direction shifter controls a transmission for translating motion of the lever to rotational drive of the wheel. The direction shifter may have a forward mode position, a neutral position, and a rearward mode position. It has been determined that the path of the direction shifter in movement among its positions should be substantially misaligned from being parallel to the motion of the lever. The path of the direction shifter may be perpendicular to the lever motion. Optionally, the path is adjustable to accommodate user preference.

As yet another possibility, the wheelchair may be steered by manipulation of the hand grip. For example, the hand grip may be coupled to a caster wheel, such that rotation of the hand grip induces rotation of the caster wheel. Thus, the hand grip may be operable to enable any or all of a number of user-controlled operations, including (a) controlling a brake by pivoting the hand grip relative to the lever, (b) triggering a parking brake mechanism by blocking the hand grip from returning to a position in which the brake is released, (c) direction shifting without removing hands from the hand grips, (d) steering of the front caster wheel and, of course, (e) accommodating the application of force to achieve motion of the lever in its forward and rearward strokes, so as to power the wheelchair.

DETAILED DESCRIPTION

Figure 1:
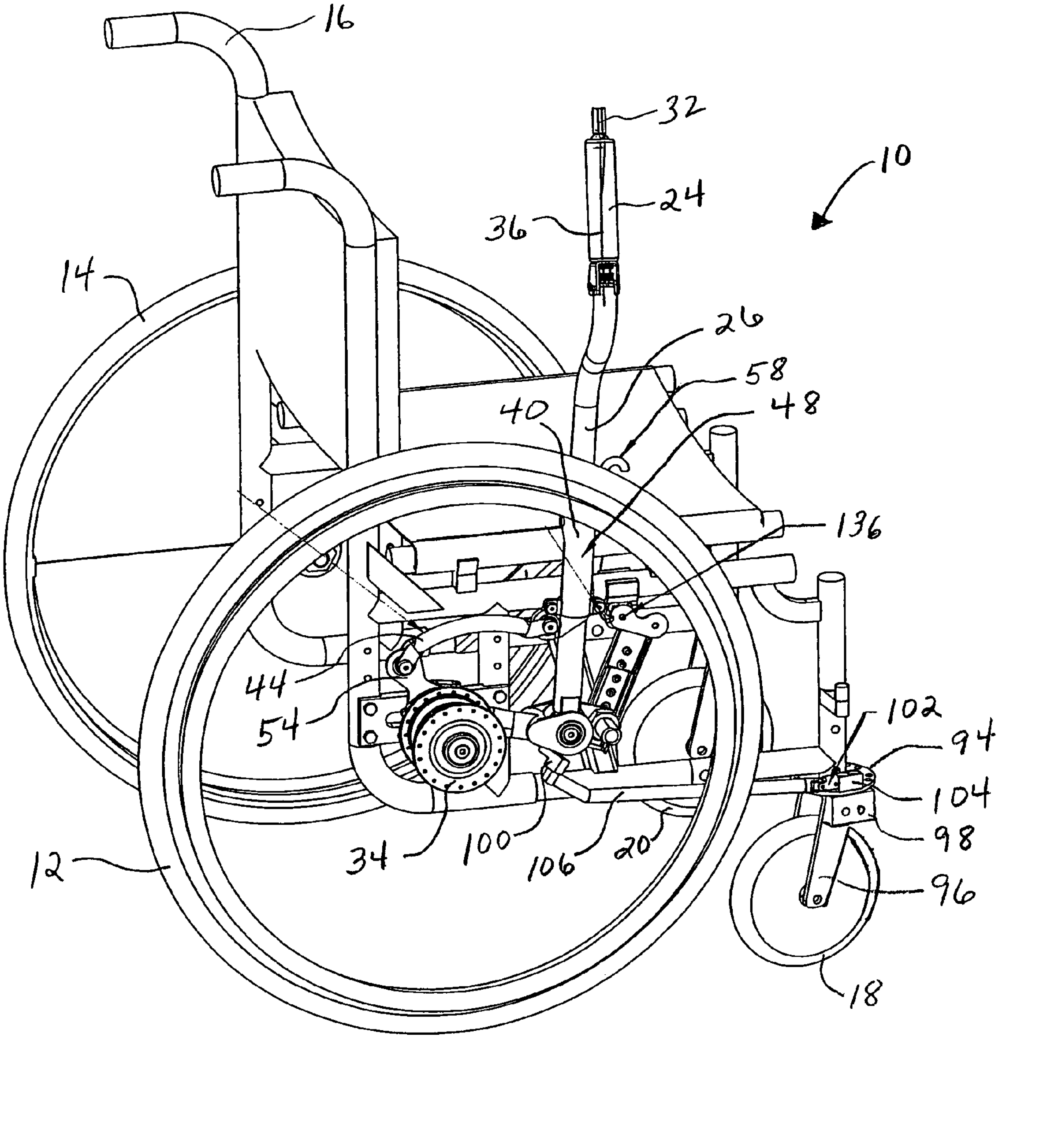
FIG. 1 is a perspective view of a wheelchair that includes a hand grip-triggering motion control system in accordance with one embodiment of the invention.

With reference to FIG. 1, a perspective view of a wheelchair 10 having a retrofit quick-release motion control system in accordance with one embodiment of the invention is shown. The motion control system utilizes lever propulsion, as will be described in detail below. While only one such system is shown, many applications will include the same system on the opposite side of the wheelchair. The second motion control system would in effect be a mirror image of the one shown in FIG. 1. The fully assembled wheelchair 10 of FIG. 1 includes a pair of drive wheels 12 and 14 at opposite sides of a frame 16. The geometry of the wheelchair frame is not significant to the present invention. In fact, the means for attaching the motion control assembly is designed to enable attachment to a wide range of different frame geometries. Nevertheless, it should be noted that the motion control system may be secured to a wheelchair frame using other approaches of attachment, and the attachment assembly to be described below may be used with other motion control systems.

The wheelchair frame 16 is formed of a number of tubular frame members, as is known in the art. In addition to the two main drive wheels 12 and 14, the wheelchair includes front steering caster wheels 18 and 20. The steering of the caster wheels will be described fully below.

Figure 2:
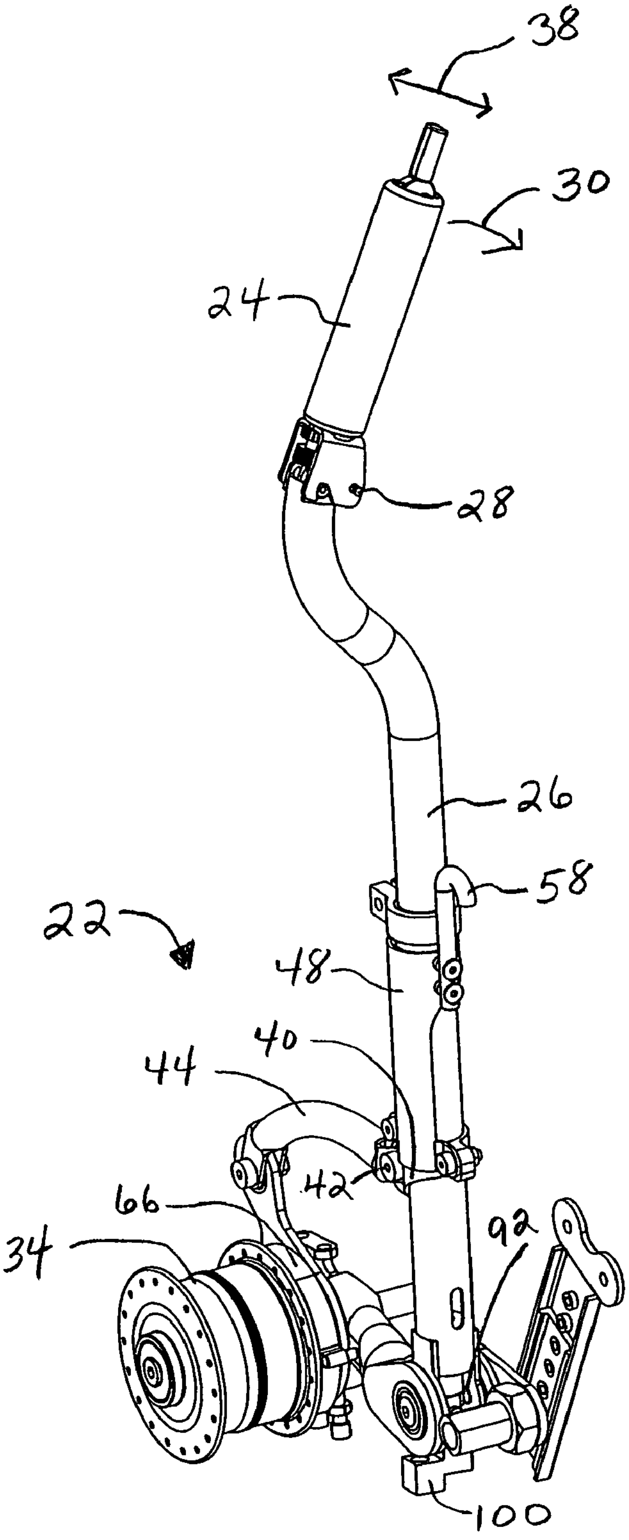
FIG. 2 is a perspective view of the motion control system of FIG. 1.

FIG. 2 illustrates one embodiment of the motion control system 22. In this embodiment, the system allows a user to (a) apply force in initiating and maintaining "rowing" of the lever drive, (b) apply controlled braking force, (c) set a parking brake mechanism, (d) shift among forward, neutral and rearward modes of operation, (e) steer a front caster wheel, and (f) adjust the applied power per lever stroke. The first five of these capabilities are controlled at the hand grip 24 of the system.

Referring to both FIGS. 1 and 2, the hand grip 24 is connected to the lever 26 along a pivot axis 28. The hand grip is shown in its rest position, but is mounted to pivot, as indicated by arrow 30. The hand grip is spring biased into this rest position, which may be referred to as the brake release position, since this position allows the drive wheel 12 to freely rotate.

The hand grip 24 includes a direction shifter 32. Central to the drive wheel 12 is a transmission-containing hub 34 that is operatively coupled to the direction shifter 32. The transmission within the hub is described in detail within U.S. patent application Ser. No. 12/079,745, to Kylstra et al., entitled "Wheelchair Drive System with Lever Propulsion and a Hub-Contained Transmission." However, the present invention is not limited to embodiments in which the transmission is contained within a hub.

FIG. 1 includes a representation of the top portion of a cable 36 which links the direction shifter 32 to the transmission. The transmission contained within the hub 34 includes at least two operational modes selected from the group of a forward mode, neutral mode and a rearward mode. In the forward mode, rowing of the lever 26 causes forward motion of the wheelchair. On the other hand, when the direction shifter is placed in its appropriate position, the rearward mode is triggered and rowing of the lever causes the wheelchair to move rearwardly. In the neutral mode, the motion of the lever does not induce wheelchair movement.

It has been determined that persons with dexterity limitations are still able to quickly and easily manipulate the direction shifter 32 when the shifter path from position-to-position is that shown in FIG. 2. Rather than a direction shifter which moves along a path generally aligned with the rowing plane of the lever 26, the direction shifter moves along a path that is substantially misaligned from the rowing plane. The direction of the shifter is shown by arrow 38. Thus, the plane in which the direction shifter moves may be the same as that of the pivot 30 of the hand grip 24. This arrangement allows a person with limited finger, thumb and/or wrist dexterity to move their hand such that the direction shifter is between the thumb and finger, allowing a simple rotation or similar motion of the entire hand to shift directions. For example, by moving the direction shifter "inboard," as viewed in FIG. 1, the transmission may be placed in its forward mode. An outboard thumb pressure may then place the direction shifter in a centered neutral position or a leftmost (as viewed in FIG. 2) rearward mode position. In other embodiments, the motion of the direction shifter is not precisely aligned with the motion of the hand grip in applying braking force. Instead, the path of the direction shifter is misaligned from both the path of the hand grip and the path of the lever 26. Optionally, the path of the direction shifter is adjustable in order to accommodate user preferences.

While not shown in the drawings, the direction shifter 32 preferably includes detents for the neutral position. This is significant since unlike a bicycle which always remains in a forward gear, there is a possibility that jarring or rugged terrain may result in inadvertent shifting that is potentially more hazardous than a shift in gear ratio. Designing the direction shifter to resist inadvertent shifting is desirable. Nevertheless, the required force by a person should be such that changes in operational modes can be easily accomplished using the thumb or palm of the person.

Figure 7:
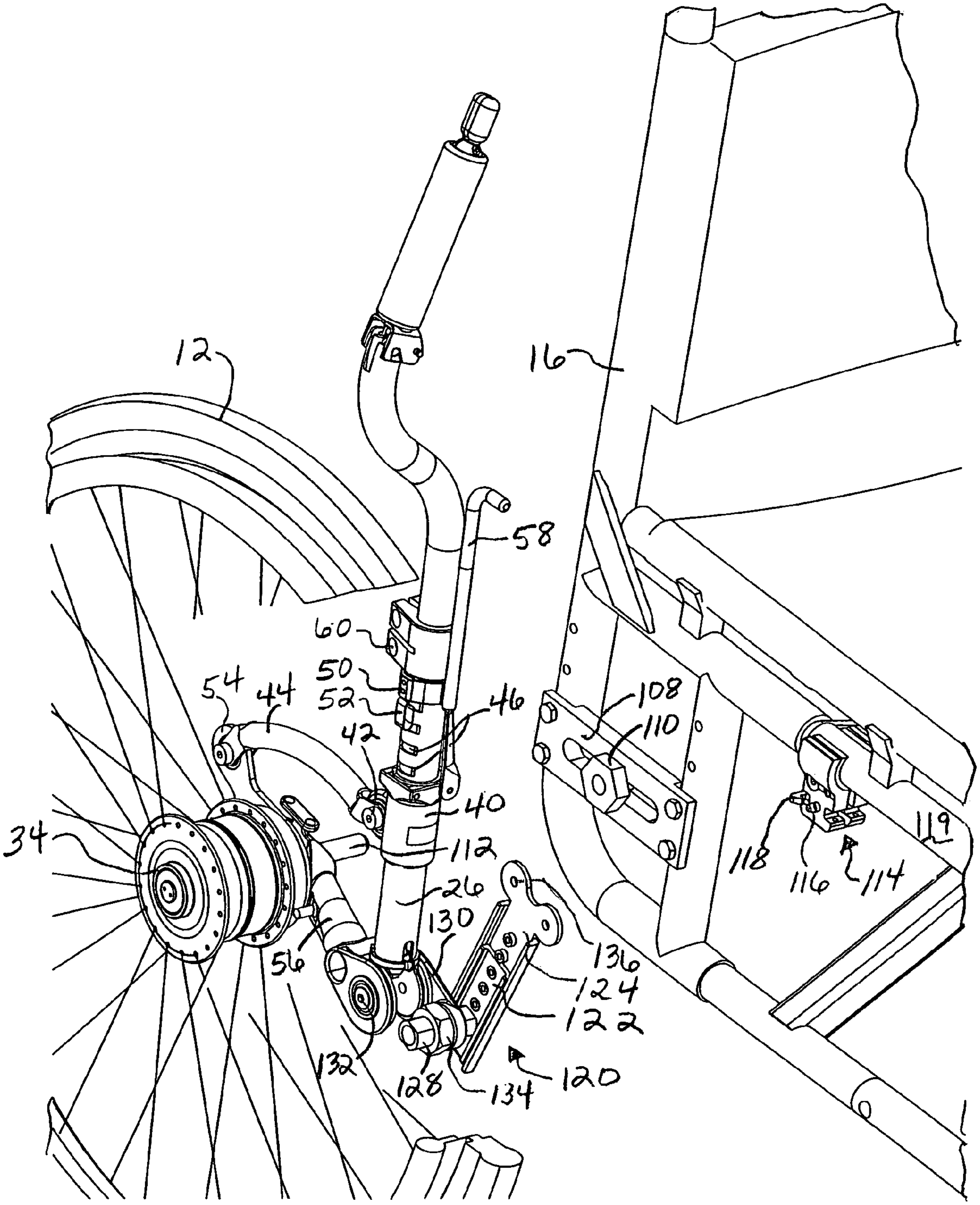
FIG. 7 is a perspective view in which the retrofit assembly is not entirely connected to the wheelchair of FIG. 1.

In addition to direction shifting, power shifting is available. Referring to FIGS. 1 and 2 and briefly to FIG. 7, a sliding bushing 40 is connected to move upwardly and downwardly along the lever 26. The sliding bushing carries a pivot bearing 42 for a power link 44. The sliding bushing is able to slide lengthwise along the arm, but it is held stable at various shift points defined along a lever. FIG. 7 illustrates a number of openings or flattened regions 46 that establish the shift points at which stability is achieved. The selection among the different shift points is one that establishes the gear ratio for the transmission-containing hub 34. The sliding bushing 40 is restrained from rotating on the lever by a yoked connection with the power link 44.

Extending upwardly from the sliding bushing 40 is a shift link 48 that operates with the openings or flattened regions 46 to define the stable shift point. The shift link has a collar 50 (FIG. 7) at its upper end. Within the interior of the collar is a detent, not shown, which mates with the selected opening or flattened region along the lever. The lower end of the shift link is fastened loosely to shoulder bolts that permit some degree of pivoting by the shift link. At the top of the shift link is a spring steel member 52 (FIG. 7) that provides bias of the shift link. With the detent pushed into a selected opening or flattened region 46, the shift link provides a means to stabilize the sliding bushing and, therefore, determines the angle of the power link 44 relative to a bracket 54 that is operative with the transmission contained within the hub 34. This angle determines the gear ratio, since the pivot end of the lever 26 is fixed in its position relative to the hub by a reaction arm 56.

To effect a change in the gear ratio, the user need only push the top of the shift link 48 in an inboard direction and then slide the mechanism upwardly or downwardly as desired. A hook 58 is included to accommodate the raising or lowering of the shift link. A fixed collar 60 is included along the length of the lever 26 to limit the upper movement of the shift link.

Figure 3:
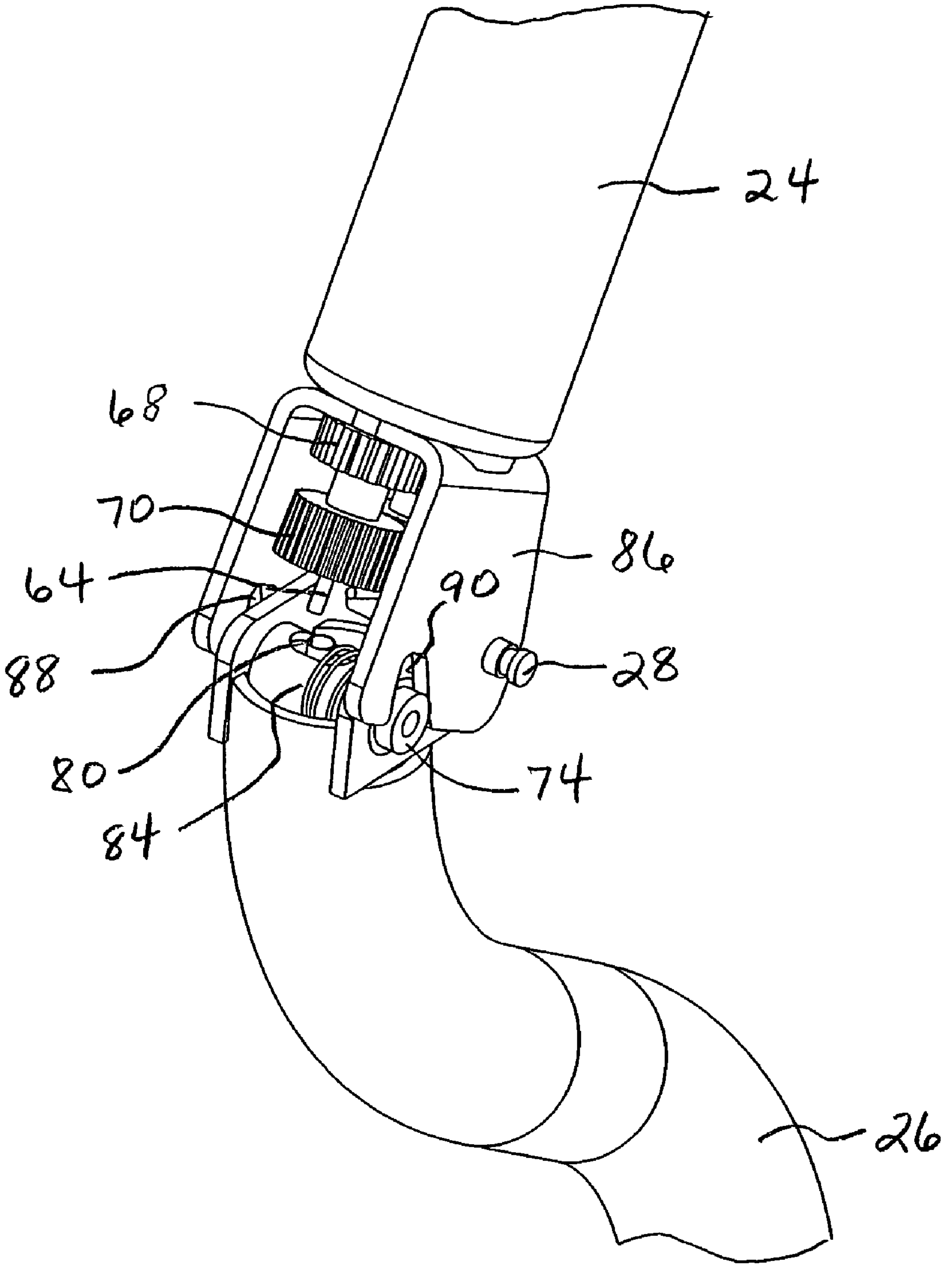
FIG. 3 is a perspective view of one embodiment of the coupling of a hand grip to a lever in the motion control system of FIG. 2.
Figure 4:
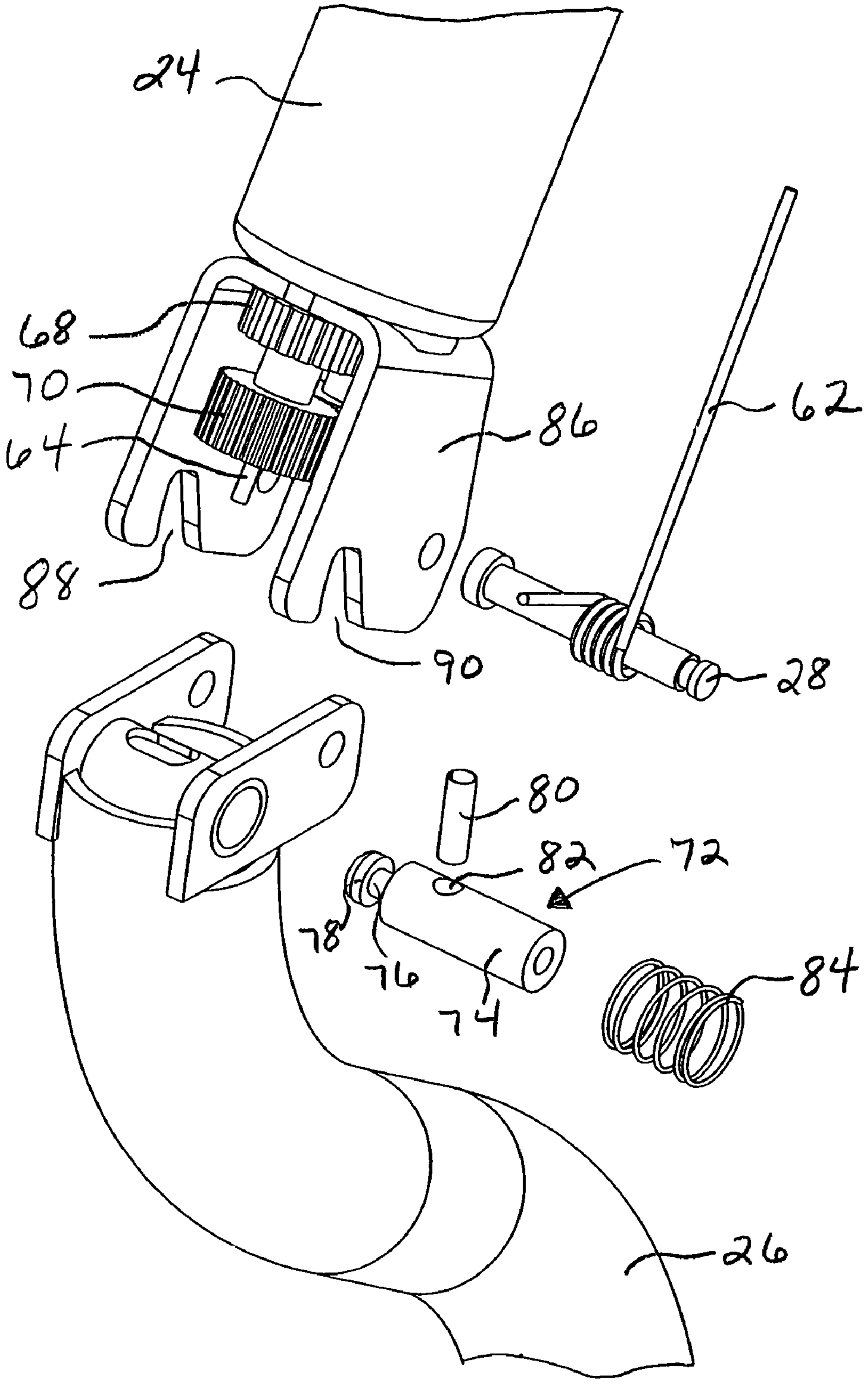
FIG. 4 is a partially exploded view of the coupling of FIG. 3.

The brake-related features will be described with reference to FIGS. 1, 2, 3, 4 and 5. FIG. 4 is a partially exploded view of FIG. 3, which illustrates one embodiment of the coupling between the lever 26 and the hand grip 24. In this embodiment, the pivot axis for "tipping" the hand grip is established by first pin 28. A helical portion of a spring 62 is wrapped around the pin 28. However, as shown in FIG. 4, the spring has a linear section that is sufficiently long to extend into the hand grip 28. The relationship of the two ends of the spring 62 provide biasing of the hand grip into a brake release position in which the wheel 12 is free to rotate, since no braking force is applied. However, the bias of the spring can be readily overcome by a user when breaking is desired.

When the hand grip 24 is tipped (pivoted) relative to the lever 26, tension is increased on a cable. In FIGS. 3 and 4, only a small portion of the cable 64 is shown. This brake cable extends along the length of the lever. The type of brake is not critical to the invention, but is shown in FIG. 2 as including a brake band 66. As would be readily understood by a person skilled in the art, the brake cable 64 may extend to the brake band, so that the tipping of the hand grip tightens the brake band so as to apply braking force to the hub 34. The applied force depends upon the degree of tipping. Significant to the invention, since the transmission permits both forward and rearward drive, the brake band may be anchored at its center instead of being anchored at an end. Anchoring at the center accommodates self-tightening in braking either forward motion or rearward motion.

Similar to adjustment of a bicycle brake, FIGS. 3 and 4 show a pair of thumb wheels 68 and 70 that permit adjustment of the braking mechanism. Thus, by rotating wheel 70, the "catch point" for applying braking force may be adjusted. Brake adjustments are understood by persons skilled in the art.

Referring specifically to FIGS. 3 and 4, a parking brake mechanism includes a second pin 72. The pin has a large diameter portion 74 and a small diameter portion 76, as well as a head portion 78. A smaller third pin 80 extends into an opening 82 of the second pin. The function of the third pin is to provide a stop for a helical spring 84. This helical spring biases the parking brake pin 72 to the left, as viewed in FIGS. 3 and 4. This leftward position will be referred to as the "first condition" of the parking brake mechanism.

At the bottom of the hand grip 24 is a bracket 86 with a pair of slots 88 and 90. When the parking brake pin 72 is in its first condition, the left-hand slot 88 is aligned with the small diameter portion 76 of the parking brake pin 72. The length of the pin ensures that the large diameter portion 74 remains unexposed, so that the pin is misaligned with the right-hand slot 90. When the pin is in the first condition, the hand grip comes to rest in its brake release condition with the end of the right-hand slot resting against the small diameter portion 76 of the pin.

On the other hand, if the hand grip 24 is tipped and the user applies pressure at the head portion 78 of the parking brake pin 72, the pin will move to its second position, which is shown in FIG. 3. When the pressure on the hand grip is released, the right-hand slot 90 will be aligned with the large diameter portion 74 of the pin. The slot is dimensioned such that the large diameter portion of the pin will prevent the hand grip from returning to its brake release condition. Consequently, braking force is continuously applied without action by the user. This capability may be used in situations such as those in which the wheelchair is being transported within another vehicle (to prevent rolling) or is to remain in a particular position on a sloped surface.

The abutment of the bracket 86 of the hand grip 24 against the large diameter portion 74 ensures that the bias provided by the helical spring 84 does not release the brake. However, a user can release the parking brake with little effort. By tipping the hand grip 24 further away from its brake release condition, the bracket moves out of contact with the large diameter portion 74. This allows the helical spring 84 to return the parking brake pin to its first condition in which neither the left-hand slot 88 nor the right-hand slot 90 is in alignment with the large diameter portion 74. When pressure is again removed from the hand grip, tension on the brake cable 64 is relaxed and braking force is removed.

Figure 5:
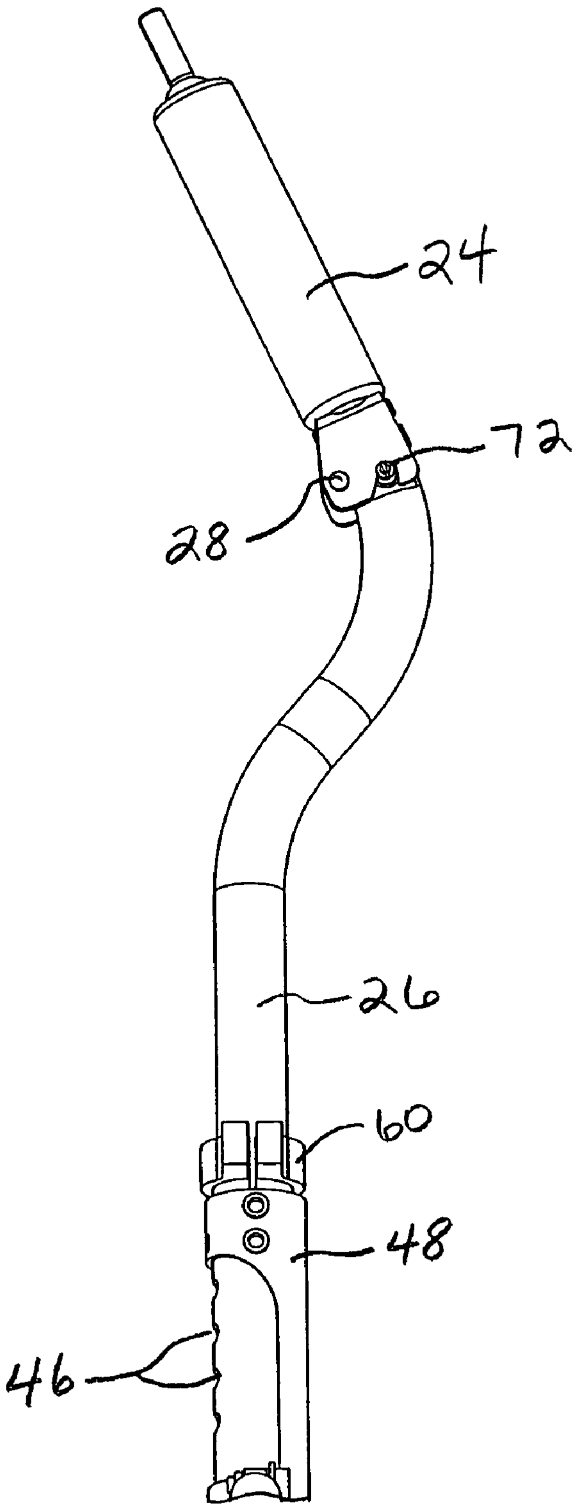
FIG. 5 is a perspective view of the upper portion of the motion control system of FIG. 2.

At least in some embodiments, the steering of the wheelchair 10 of FIG. 1 may be accomplished by manipulations at the hand grip 24. If levers are provided on both sides of the wheelchair, steering is possible using different applications of force on the two levers. However, in the embodiment of FIG. 1, additional steering capability is available, since the motion control system includes linkage to the front caster wheel 18. As shown in FIGS. 1, 2 and 5, the hand grip 24 is offset relative to the main portion of the lever 26 to provide a crank arm geometry that gives the rider control over rotation of a steering shaft. This steering shaft exits at the bottom of the lever tube. A universal joint 92 (FIG. 2) is fixed at the lower end of the steering shaft. The center of the universal joint is on the pivot axis of the lever 26. This counteracts any interference between force applied to the lever to accomplish a power stroke and force applied for the purposes of steering.

As shown in FIG. 1, above the front caster wheel 18 is a plate. This plate may be inserted on top of the conventional caster yoke 96 and below the nut that is commonly used. A block 98 is attached at the underside of the plate to rotationally lock the plate to the caster yoke. The block is fastened in position by screws that allow the assembly to be adjustable for different wheelchairs.

As noted, a universal joint 92 is at the bottom of the steering column of the lever 26. A first crank arm 100 is fixed to the bottom of this universal joint. A second universal joint 102 and a second crank arm 104 are located at the top of the plate 96 fixed to the front caster wheel 18. A tie rod 106 having yokes at each end connects the first crank arm 100 to the second universal joint 102. It has been determined that the connection of the caster crank arm 104 acts to prevent the front universal joint and the tie rod from rotating about the long axis of the tie rod. This constraint stabilizes the universal joint 92 at the bottom of the steering shaft. Without this constraint, the lower part of the universal joint 92 might require a bearing support.

It should be noted that even if the wheelchair 10 of FIG. 1 includes a second lever on the opposite side of the wheelchair, it is not necessary to duplicate the steering linkage. The opposite side caster wheel 20 will follow the direction dictated by the steered caster wheel 18, which is controlled by applying a small amount of angular force at the hand grip 24.

Retrofit Attachment

An attachment scheme for providing a retrofit lever propulsion assembly will be described with reference to the motion control system described above. However, the attachment approach may be applied to other lever propulsion systems for retrofit to a wide range of wheelchair geometries. The attachment will be described primarily with reference to FIGS. 6, 7 and 8.

As best seen in FIG. 7, connected to the frame 16 of the wheelchair is a bracket 108 that supports an axle bearing 110. The axle bearing is dimensioned to receive an axle 112 of the wheelchair drive wheel 12. Quick-release approaches for coupling an axle to an axle bearing of a wheelchair are well known in the art. Often, a release button is included to allow the axle to be removed for purposes of storage or transportation. While such a release button may be included as an element of the attachment approach described in accordance with the invention, such a release is not critical, since the attachment utilizes other securing means.

Figure 6:
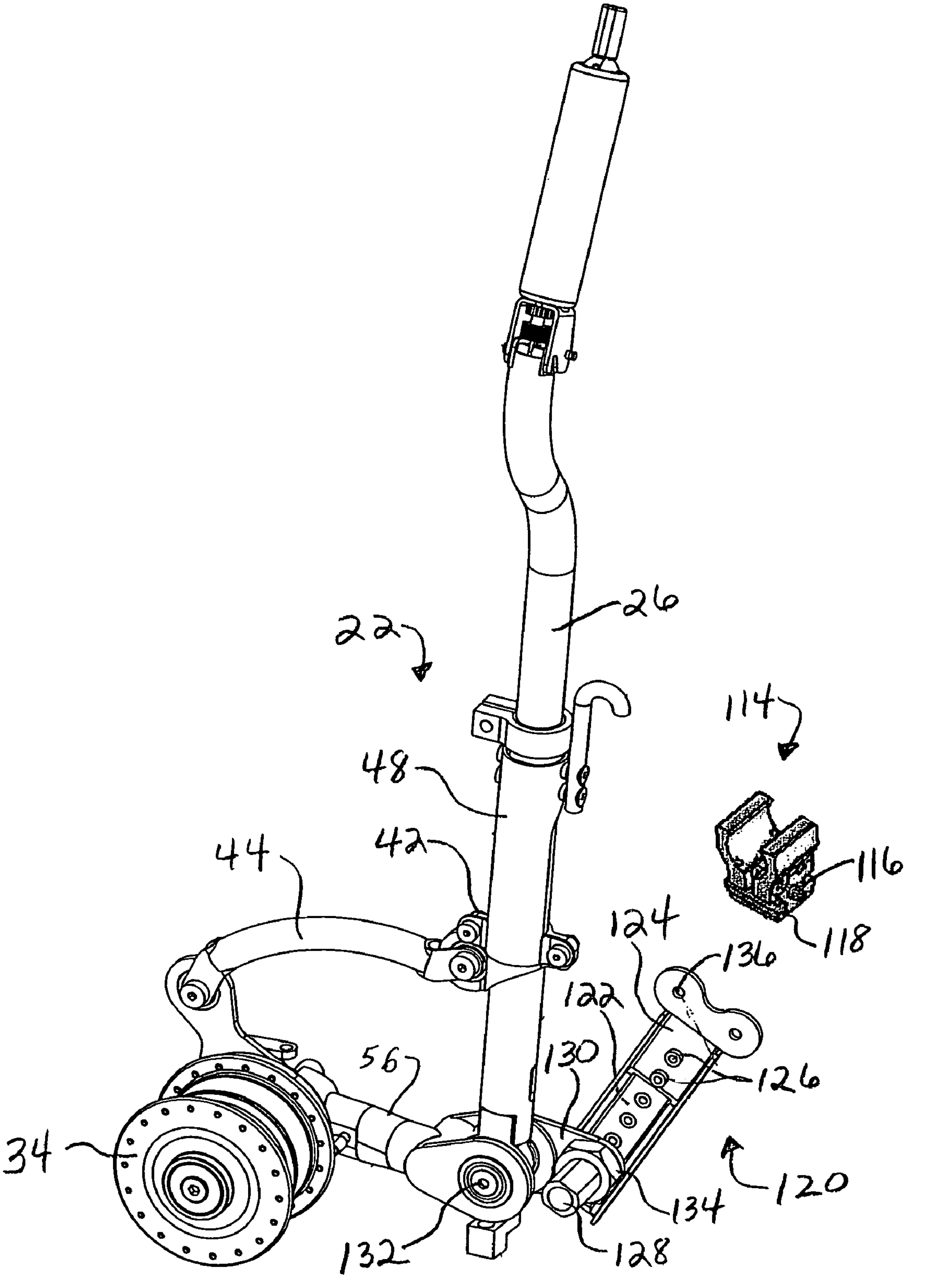
FIG. 6 is a perspective view of the retrofit-ready motion control system of FIG. 1.

The attachment assembly includes a clamp 114, as best seen in FIG. 6. The clamp is shown as having an arcuate interior surface to conform to standard tubular frame members. However, greater flexibility may be achieved by using a V clamp, since such clamps may be used for connection to tubular frame members of various diameters and potentially to non-tubular frame members.

The clamp 114 may be tightened onto a member using set screws or other fasteners. A secure fit is important. Projecting outwardly from the surface of the clamp is a projection, such as a pin 116. As will be described in detail below, this pin is one of the alignment features used to secure the motion control system 22 to the frame of the wheelchair. Once in place, a spring-biased latch 118 locks the motion control system in place.

In FIG. 7, the clamp 114 is shown secured to a horizontal frame member 119 of the wheelchair frame 16. Since the attachment approach of the present invention provides significant flexibility with respect to the position of the clamp, the location as shown in FIG. 7 is not significant. However, there are advantages to applying the attachment to a horizontal frame member, particularly one proximate to the seat of the wheelchair frame. This location is better equipped to withstand the forces applied when using lever propulsion. Nevertheless, the invention extends to applications in which the clamp is attached to a vertical frame member and to applications in which the alignment features are coupled laterally, similar to the lateral coupling of the "alignment features" of a latch for a car door.

Referring now to FIGS. 6 and 7, in addition to the clamp 114, the attachment assembly includes an attachment device 120 that is adapted and connected to provide three dimensions of adjustment, so as to accommodate retrofit to wheelchair frames of various geometries. Briefly, the attachment device is formed of two members 122 and 124 which enable length adjustability, the attachment device is connected at a pivot axis that enables angular adjustability (and therefore lateral adjustability), and the attachment device is connected using hardware which enables offset adjustability along its pivot axis.

In the embodiment shown in FIGS. 6 and 7, the length adjustability is a consequence of using first and second members 122 and 124 that can be coupled on the basis of the wheelchair frame to which the motion control system is to be attached. The second member 124 includes side rails that capture the first member 122, preventing lateral movement of one member relative to the other despite the forces that are applied in rowing the lever 26. While the first member fits within the second member, the two members cannot slide relative to each other. This is because the second member includes a series of internally threaded collars 126 that are dimensioned to fit within holes of the first member. The spacing between the collars matches that of the holes of the first member. In the relationship shown in FIGS. 6 and 7, two collars 126 remain outside of the holes within the first member, but a greater number or a lesser number of collars may be freed from the holes in attachment to different wheelchair frames. When the desired length is achieved, fastening members, not shown, are threaded into one or more of the collars that are received within the holes of the first member.

The end of the first member 122 is connected to the motion control system 22 by hardware which defines the pivot axis for the angular adjustability and which enables the offset adjustability. Thus, the angular and offset adjustabilities are coupled. FIG. 7 illustrates one embodiment of the hardware, but other arrangements may be substituted. An externally threaded member 128 is fixed to the attachment member 120 through a bracket 130. The externally threaded member defines the pivot axis of the attachment device. This pivot axis is spaced apart from the pivot axis 132 of the lever 26. One or more nuts 134 and the bracket 130 may be internally threaded. When the nut 134 is loosened, the attachment device 120 is free to rotate about its pivot axis. Additionally, the distance between the bracket 130 and the attachment device 120 can be varied, thereby providing the offset adjustability. This offset adjustability is significant, since the distance of the bracket 130 from the frame of a wheelchair will be dictated by the geometry of the quick-release mechanism for the axle bearing (110 in FIG. 7). This distance between the bracket 130 and the frame may vary among different wheelchairs. An advantage of this embodiment is that by coupling the offset and angular adjustabilities in this manner, the threaded member 128 will not rotate after the attachment device is coupled to the clamp, even if the nut 134 is removed.

In operation, the clamp 114 is fastened to the frame member 119 of the wheelchair frame 16. The position of the clamp will change from wheelchair-to-wheelchair, but the clamp is preferably connected to a horizontal frame member and most preferably to a horizontal frame member adjacent to the seat of the wheelchair. After the clamp has been properly fastened, the axle 112 of the wheel 12 is inserted into the axle bearing 110. The length, the angle, and the distance of the attachment device 120 relative to the bracket 130 are set such that an opening 136 at the end of the attachment device is aligned with the pin 116 on the clamp. As an alternative to the cylindrical opening 136, a slot or other reception feature may be formed at the end of the attachment device.

Figure 8:
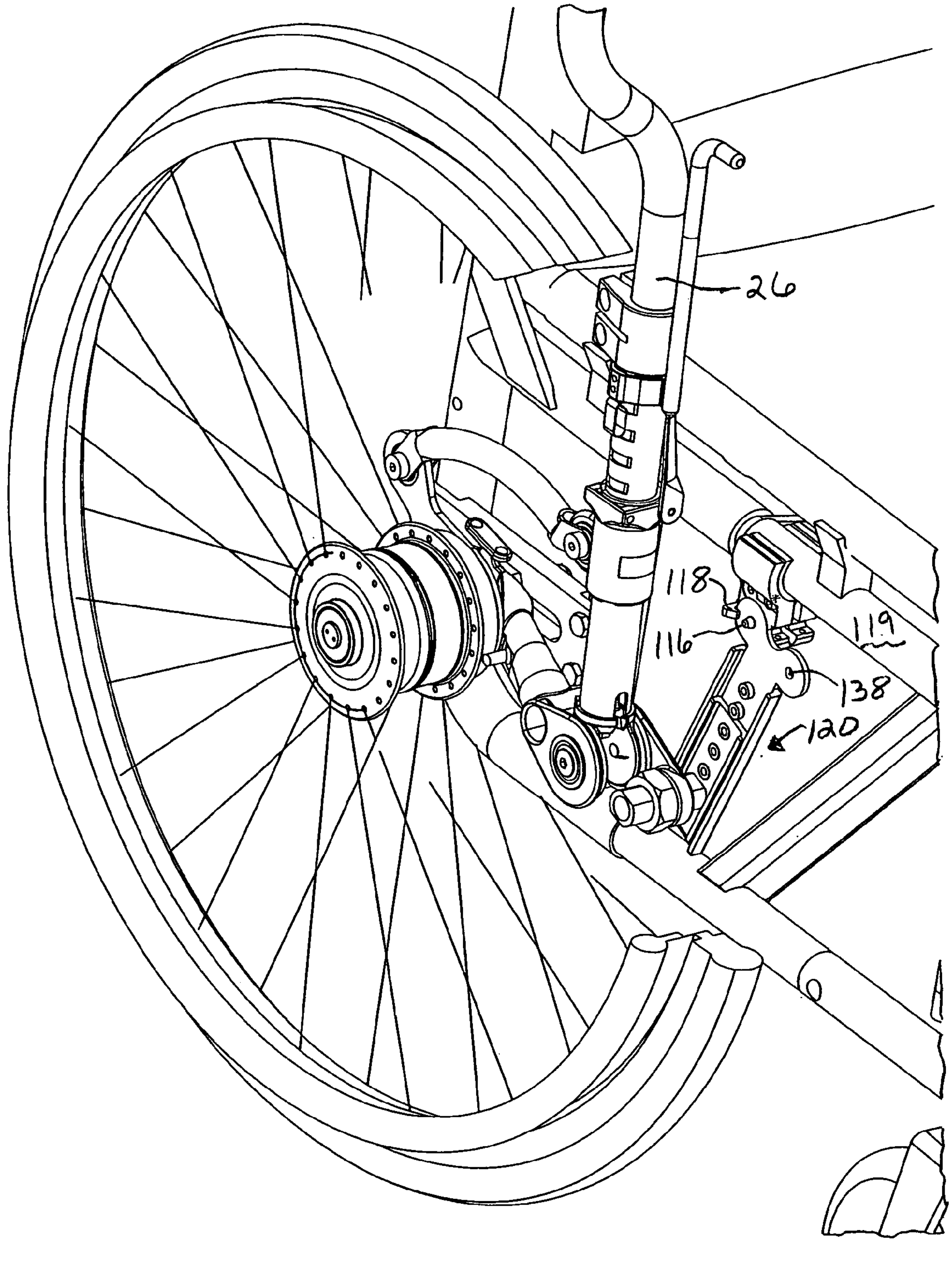
FIG. 8 is a perspective view of the retrofit assembly of FIG. 7 following attachment to the frame of the wheelchair.

FIG. 8 shows the latch 118 of the clamp 114 holding the attachment device in position after the pin 116 is properly seated. The edge of the attachment device 120 around the opening is arcuate, so that the latch works well, regardless of the angle of the attachment device. In the illustrated embodiment of the attachment device, a second opening 138 is included to increase the flexibility of use of the attachment device with different wheelchair frames.

While the retrofit assembly has been described as one in which the pin 116 is located on the clamp and the opening 136 is through the attachment device 120, this arrangement may be reversed. Locating the pin on the clamp may provide an advantage with respect to visibility during the alignment process for some applications of the invention, but the arrangement is not critical. Additionally, the invention extends to applications in which the attachment device approaches the clamp laterally. That is, the alignment features of the attachment device and clamp may be configured to couple in a manner similar to a latch of a car door.

What is claimed is:

1. A motion control system for a wheelchair having first and second main wheels comprising:

a lever connected at a lever pivot to enable forward and rearward strokes, said lever being operatively coupled to said first wheel to drive said first wheel;

a brake connected to selectively apply braking force to said first wheel;

a hand grip projecting from an end of said lever to extend a length along which force can be applied to initiate and maintain said forward and rearward strokes, said hand grip being pivotally connected to said end and being operatively associated with said brake such that movement of said hand grip relative to said lever controls said brake, said hand grip being biased into a brake release position in which said brake is in a condition to allow rotation of said first wheel, said hand grip and said brake being linked such that pressure applied in a direction to pivot said hand grip from said brake release position induces said brake to apply said braking force; and a direction shifter projecting from an end of said hand grip opposite to said lever, said direction shifter being operatively associated with a transmission for translating motion of said lever to rotational drive of said first wheel, said direction shifter having a forward mode position, a neutral position and a rearward mode position for selecting among forward, neutral and rearward modes of transmission operation, wherein said direction shifter projects from said hand grip such that said direction shifter projects along a longitudinal axis of said hand grip in one of said forward mode position, neutral position or rearward mode position.

2. The motion control system of claim 1 wherein said direction shifter pivots so as to have a position-to-position path that is substantially misaligned from being parallel to motion of said lever.

3. A motion control system for a wheelchair having first and second main wheels comprising:

a lever connected at a lever pivot to enable forward and rearward strokes, said lever being operatively coupled by a slidable link to a pivot on said first wheel to drive said first wheel;

a brake connected to selectively apply braking force to said first wheel;

a hand grip projecting from an end of said lever to extend a length along which force can be applied to initiate and maintain said forward and rearward strokes, said hand grip being pivotally connected to said end and being operatively associated with said brake such that movement of said hand grip relative to said lever controls said brake, said hand grip being biased into a brake release position in which said brake is in a condition to allow rotation of said first wheel, said hand grip and said brake being linked such that pressure applied in a direction to pivot said hand grip from said brake release position induces said brake to apply said braking force; and a steering assembly for controlling a caster wheel of said wheelchair, said steering assembly being operable by rotation of said hand grip.

4. A motion control system for a wheelchair having first and second main wheels and first and second caster wheels, said system comprising:

a lever operatively coupled to said first wheel to drive said wheel in response to motion of said lever;

a brake mechanism coupled to said first wheel to selectively apply braking force; and a hand grip connected to said lever at a pivot axis, said hand grip having a direction shifter extending from an end that is opposite to said lever, said hand grip being operable to enable a plurality of user-controlled operations, including:

(a) said hand grip being coupled to said brake mechanism such that movement of said hand grip about said pivot axis controls application of said braking force;

(b) said hand grip and said lever being selectively locked into a fixed relationship by a parking brake mechanism, said parking brake mechanism having a release condition in which said hand grip is free to pivot about said axis and having a braking condition in which said hand grip is restricted from pivoting to a position in which application of said braking force is released;

(c) said direction shifter being coupled to a transmission connected to transfer said motion of said lever to said first wheel, said transmission having forward-drive and rearward-drive modes, said direction shifter operatively associated with said transmission such that movement of said direction shifter controls shifting between said forward-drive and rearward-drive modes; and (d) said hand grip being configured and said pivot axis being aligned such that force applied to said hand grip to achieve said motion of said lever is directly coupled to said lever, wherein the motion control system further includes a gear ratio control for adjusting power transfer from said lever to said wheel, said gear ratio control including a power link having a first end pivotally connected relative to said lever by a connector which is configured to be adjustable along a length of said lever.

5. The motion control system of claim 4 wherein said user-controlled operations enabled at said hand grip further include (e) steering of said first caster wheel, said hand grip being coupled to said first caster wheel through said lever, such that rotation of said hand grip induces rotation of said first caster wheel.

6. The motion control system of claim 4 wherein said gear ratio control includes a sliding member along said length of said lever and includes a series of receiving features within said length, said sliding member including a coupling feature configured to seat with any one of said receiving features to define a plurality of rest positions of said sliding member along said length.

7. The motion control system of claim 6 wherein said gear ratio control further includes a hook connected to enable unseating of said coupling feature from one of said receiving features for adjusting a current rest position of said sliding member.

8. The motion control system of claim 4 wherein said parking brake mechanism includes a pin that is spring biased into said release condition.

9. The motion control system of claim 4 wherein said pivot axis of said hand grip is generally parallel to a path for said motion of said lever.

* * * * *